(12) United States Patent
Freudenberg

(10) Patent No.: US 6,685,428 B1
(45) Date of Patent: Feb. 3, 2004

(54) INTEGRATED BOOT, SEAL AND IMPELLER SYSTEM

(75) Inventor: Martin E. Freudenberg, Concord, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 09/679,332

(22) Filed: Oct. 4, 2000

(51) Int. Cl.$^7$ ................................................ F01D 11/00
(52) U.S. Cl. ..................................... 415/174.3; 416/234
(58) Field of Search .......................... 415/174.3, 174.2, 415/230; 416/234, 174

(56) References Cited

U.S. PATENT DOCUMENTS

| | | | |
|---|---|---|---|
| 2,118,681 A | | 5/1938 | MacDonald |
| 2,671,407 A | | 3/1954 | Higbie |
| 3,367,274 A | * | 2/1968 | Lombard ................. 415/124.2 |
| 3,536,412 A | * | 10/1970 | Beare et al. .............. 415/124.2 |
| 3,702,745 A | * | 11/1972 | Segerbrecht ............ 415/174.2 |
| 3,846,045 A | | 11/1974 | Mincuzzi |
| 4,342,538 A | * | 8/1982 | Wolford et al. ............. 415/231 |
| 4,502,697 A | | 3/1985 | Heinl |
| 4,904,166 A | * | 2/1990 | Wasemann ................. 417/360 |
| 4,925,366 A | | 5/1990 | Dorski |
| 5,009,570 A | * | 4/1991 | Richardson .............. 415/174.2 |
| 6,062,815 A | * | 5/2000 | Holt et al. .................. 415/231 |

FOREIGN PATENT DOCUMENTS

FR 2594519 A1 * 2/1986 ............ F16J/15/54

* cited by examiner

*Primary Examiner*—Edward K. Look
*Assistant Examiner*—Igor Kershteyn
(74) *Attorney, Agent, or Firm*—Ronald W. Wangerow; Donald A. Wilkinson, MacMillan, Sobanski & Todd, LLC

(57) ABSTRACT

An integrated boot, seal and impeller system is adapted for being driven by a pump shaft. The system includes an impeller unit having a plurality of radially extending blades, a hub portion, a recess in the hub portion and a tubular portion extending from the hub portion. The tubular portion is engaged to the shaft and has an outer diameter with at least one flat in the outer diameter. A seal head is slidingly engaged to the tubular portion. The seal head also has an inner diameter with at least one flat on the inner diameter to engage the outer diameter of the tubular portion. A flexible boot extends from the elastomeric blades. The boot has a distal portion adjacent to the seal head. Additionally, a biasing member is disposed in the recess and urges the seal head into engagement with the seal washer.

18 Claims, 2 Drawing Sheets

INTEGRATED BOOT, SEAL AND IMPELLER SYSTEM

BACKGROUND OF THE INVENTION

This invention generally relates to pumps with impellers and in particular to an integrated elastomeric seal impeller and boot for use in a pump.

Water pumps with impellers are used in appliances, such as dishwashers and washing machines, to move liquid through and out of the appliance in a series of wash, rinse, and drain cycles. Typically, the pump includes a housing, a rigid cover, and an elastomeric impeller molded around a rigid impeller insert for slip fitting onto a rotatable drive shaft or motor shaft. A separate mechanical face seal assembly consisting of a seal head assembly and a seal seat for preventing liquid leakage between the fixed housing and the rotating impeller, and a two-piece thrust bearing, one half mounted in the impeller for running against the other half mounted in the rigid cover, are used. This thrust bearing resists the axial force of the mechanical face seal and also establishes the axial running clearances of the impeller with both the housing and the rigid cover.

The assembly of all these separate components can lead to mis-assembly and damage to critical sealing components. Some prior art pumps have used some pre-assembly of components to reduce handling and assembly time. However, these prior art pumps have not been widely adopted because of the cost of the additional pre-assembly.

Thus, there is a need to solve these problems and to provide a simple, more cost effective combination of a mechanical face seal boot and a pump impeller which integrates the boot with the impeller so that the biasing spring and seal seat are disposed within the pump impeller, thereby protecting these components from damage or contamination and reducing the number components, reducing cost, and reducing assembly time.

SUMMARY OF THE INVENTION

The present invention seeks to solve these problems by providing an integrated boot, seal and impeller system for use in a pump.

The present invention is directed to an integrated boot, seal and impeller system that is adapted for pumping fluid by a power shift. The system includes an impeller unit having a plurality of radially extending blades, a hub portion, a recess in the hub portion and a tubular portion extending from the hub portion. The tubular portion is engaged to the shaft and has an outer diameter with at least one flat in the outer diameter. A seal head is slidingly engaged to the tubular portion. The seal head also has an inner diameter with at least one flat on the inner diameter to engage the outer diameter of the tubular portion. A flexible boot extends from the elastomeric blades. The boot has a distal portion adjacent to the seal head. Additionally, a biasing member is disposed in the recess and urges the seal head into engagement with the seal washer.

It is an object of the present invention to provide an integrated boot, seal and impeller system for use in a water pump to protect the components from damage during the assembly process.

It is another object of the present invention to provide a simpler, more cost effective boot, seal and impeller construction which integrates the boot and impeller to reduce the number of components required and reduce assembly time. The present invention provides an integrated boot, seal and impeller. construction that is simpler and more cost effective, and which allows for pre-testing of the integrated boot, seal and impeller assembly for leakage prior to installation to the pump.

Still another object of the present invention is the elimination of the separate molding of a protective boot for the seal components thereby allowing for a simpler assembly of the seal for use in a pump.

These and other objects and features of the present invention will become apparent from the description and especially taken in conjunction with the accompanying drawings illustrating the invention and the preferred embodiment.

BRIEF DESCRIPTION OF THE DRAWINGS

The various advantages of the present invention will become apparent to one skilled in the art upon reading the following specification and by reference to the drawings which include.

DETAILED DESCRIPTION OF THE PREFERRED EMBODIMENT

Figure 1:
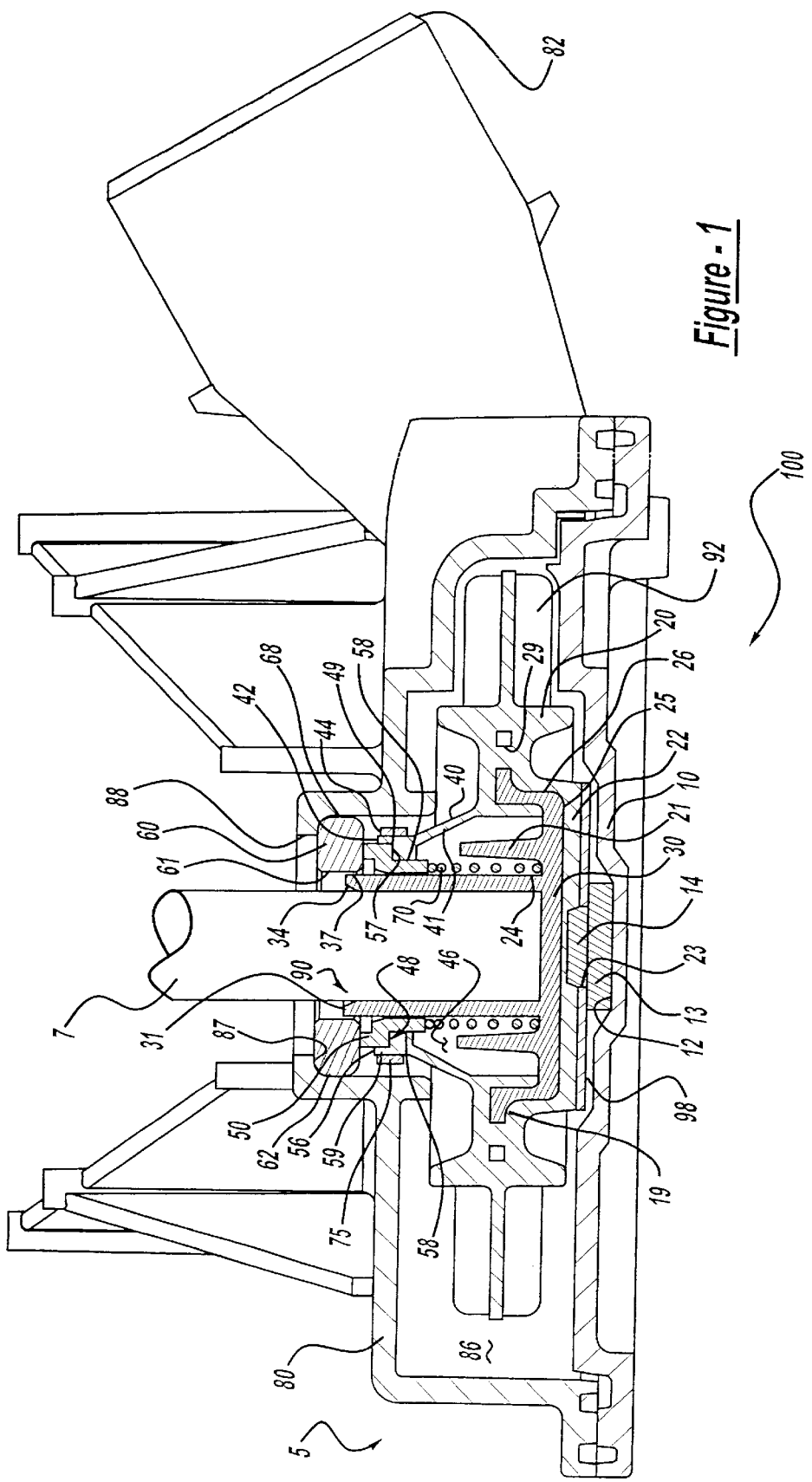
FIG. 1 is a cross-sectional view of the present invention as installed in the pump housing and cover.
Figure 2:
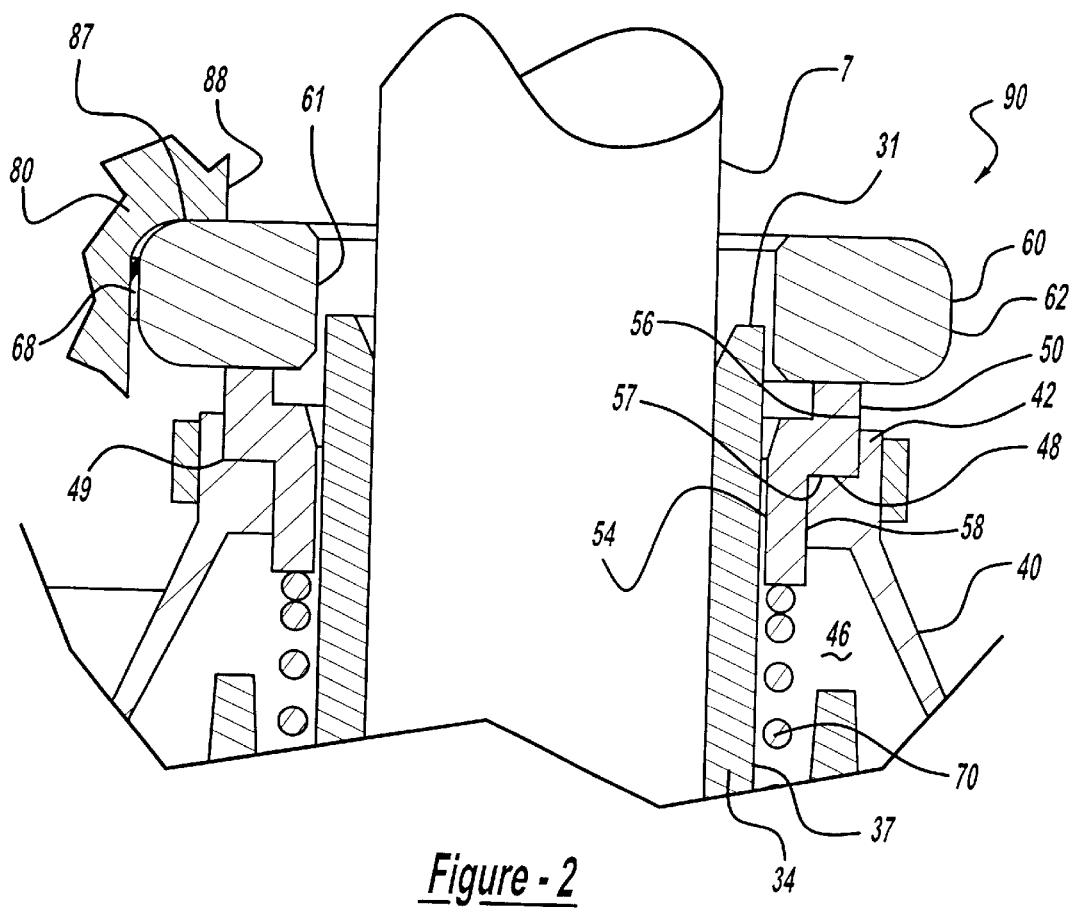
FIG. 2 is a cross-sectional view of the impeller and seal ring assembled on the tubular portion.

A water pump 100 is fitted with the integrated impeller seal and boot system 90 according to the present invention as shown in FIGS. 1 and 2. The system 90 is adapted to be used in a pump unit 5. The pump unit 5 includes a cover 10, a housing 80 having a generally U-shaped cross-section and an inlet 82 and outlet (not shown). The cover 10 is preferably welded to the housing 80, however, it can be secured by any other appropriate means to the pump housing 80 to form a pump cavity 86 in which the unitized impeller, seal and boot system 90 operate. The system 90 includes an impeller 20 which has a rigid insert 30 with a tubular extension or portion 34, a boot 40 and a seal washer 50. The extension 34 is connected to a shaft 7 of a motor (not shown) to form a complete pump assembly. In the preferred embodiment, the motor is an electric motor but any other type of motor may be used. The motor shaft 7 is engaged to the tubular extension 34 by conventional means. The motor allows for rotational forces to be provided to the impeller 20 in order to pump a liquid for an appliance, such as a dishwasher, washing machine or the like.

A two-piece thrust bearing consisting of a graphite phenolic thrust button 13 mounted in a cavity 12 in the cover 10 and a ceramic thrust disk 14 mounted in a partial opening or cavity 23 in the face 22 of the impeller 20 establishes the axial running clearance 98 of the face 22 of the impeller 20 with both the housing 80 and the cover 10 and it also determines the axial running height of the mechanical face seal assembly 59.

Figure 3:
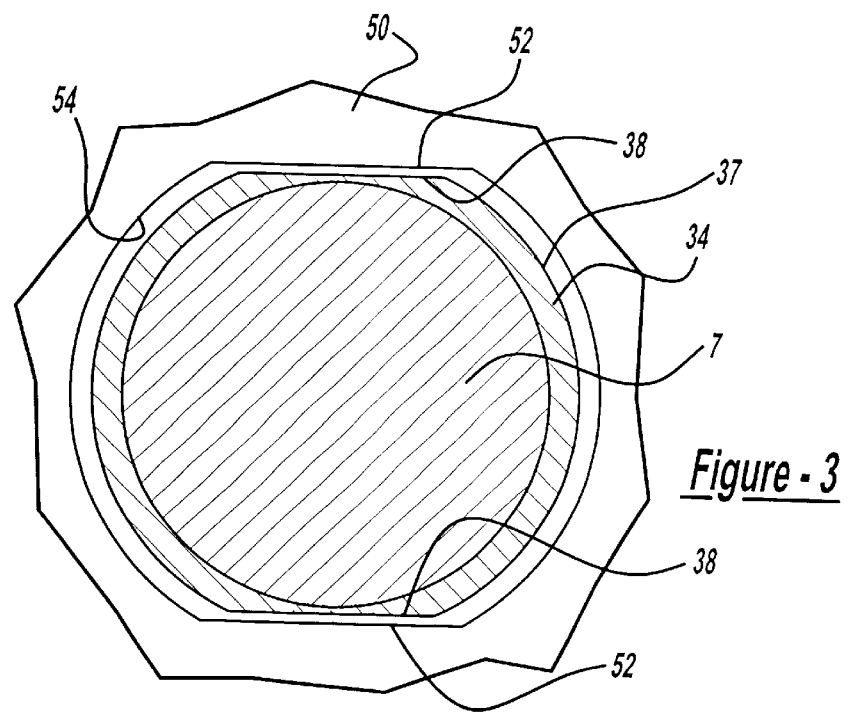
FIG. 3 is a cross-sectional view of the present invention rotated 90 degrees from FIG. 2 and showing the seal ring engaged to the tubular portion.

The elastomeric blade impeller 20 is molded onto or, alternatively, attached by conventional means to a rigid impeller insert 30. The rigid insert 30 may be made of metal such as steel or aluminum or the like or preferably from a glass filled reinforced thermoplastic such as nylon 6—6 with 30% glass filled fiber. Alternatively, the rigid insert 30 may be made from a glass filled thermoset plastic polymer such as phenolic. The rigid insert 30 has a tubular extension 34 which extends axially from the inner portion of face 22 of the rigid insert 30 to the projecting end 31. The outer diameter 37 of the tubular extension 34 has a pair of flats 38, as shown in FIG. 3.

Returning to FIGS. 1 and 2, the graphite phenolic thrust button 13 is inserted into a partial cavity 12 in the cover 10 and a ceramic thrust disk 14 mounted in a partial opening 23 in the face 22 of the impeller insert 30. As stated earlier, the thrust button 13 sets the axial clearance 98 of the face 22 relative to the cover 10.

The rigid impeller insert 30 has a radially extending portion 25 which is formed radially from the outer portion of the face 22. An axially extending section 26 and a second radially extending section 19 extend from the radially extending portion 25. A second axial projection 21 extends axially from the inner portion of the face 22 and radially between the radially extending portion 25 and the outer diameter 37 of the tubular extension 34.

The blades 92 of the impeller 20 are preferably made of elastomeric material which permits the blades 92 to be bonded and molded onto the rigid impeller insert 30. The elastomeric material is also molded and bonded around radially extending portion 19, radially extending portion 25 and the axially extending section 26. The elastomeric material is a polymer which is preferably nitrile or, alternatively, it may be hydrogenated nitrile or any other suitable thermoset or thermoplastic elastomeric material. A conventional bonding agent is used to bond the elastomeric material to the insert 30 and to radially extending portions 25, 19 and axially extending section 26. When the elastomeric material is molded to the rigid impeller insert 30 and while the elastomer is still in a plastic state, the elastomer flows from the face 22 of the insert 30 through the holes 29 in portion 19 and around radially extending portion 19 and axially extending portion 26, to form the blades 92 and the boot 40. After the vulcanization process, an elastomeric portion 41 forms and extends axially and radially to form an elastomeric boot 40. The boot 40 extends axially from the elastomeric portion 41 of the inner diameter of the axially extending section 26 and radially along the outside surface of the radially extending section 25 and the radially extending portion 19 of the impeller insert 30. The boot 40 is integrally formed with the blades 92 and the elastomeric portion 41. The axially extending distal end 42 is formed from the boot 40 and is adjacent to but spaced away from the outer diameter 37 of the tubular extension 34. The distal end 42 is cantilevered from the axially extending section 26 and the radially extending portion 19 so as to form an open ended receiving cavity 46.

The distal end 42 cooperates with a step 57 in an annular seal ring or washer 50 with the corresponding stepped portion 48 in the rubber boot 40. The seal washer 50 is preferably made of ceramic material but, alternatively, it can be made of carbon, metal, or plastic, or any other suitable material. In forming the seal washer 50, it may be cast, sintered, fired, or molded, as is conventional.

The seal washer 50 is disposed around the tubular extension 34 and is positioned axially adjacent to the seal seat 60. The seal seat 60 has an outer diameter 62 with a pair of flats, preferably in opposing orientation. The outer diameter 62 of seal seat 60 is surrounded by a thin elastomeric annular layer 68. The elastomeric layer 68 and the seal seat 60 are disposed in a partial bore in the shoulder 87 in the housing 80. The partial bore has a pair of flats (not shown) which correspond to the pair of flats (not shown) in the seal seat 60.

The seal seat 60 and the annular layer 68 are pressed or inserted into the partial bore in the housing 80. The press fit forms a compressive force on the elastomeric layer 68 which in turn puts a slight compressive force on the outer diameter 62 of the seal seat 60 to capture the seal seat 60 in the partial bore. The pair of flats in the seal seat 60 cooperatively engage the pair of flats in the housing 80 to prevent rotational movement of the seal seat 60 relative to the housing 80. The seal seat 60 abuts against the shoulder 87.

The spring 70 is a helical coil compression spring but, optionally, the spring 70 may be an elastomeric member that is compressed or a cantilevered biasing member. The spring 70 is disposed around the tubular extension 34 and one end abuts against the partial bore 24 in the impeller 20 and the other end abuts against the seal washer 50 to bias it into engagement with the seal seat 60. The elastomeric boot 40 is made of the same polymer as the elastomeric blades 92

As shown in FIG. 3, the seal washer 50 is rotationally driven by flats 52 on its inside diameter 54 which engage corresponding flats 38 on the outer diameter 37 of the tubular extension 34. Thus, the seal washer 50 is positively driven rotationally by the mechanical engagement of the flats 52 on the inner diameter 54 of the seal washer 50 with the corresponding flats 38 on the extension 34 of the impeller insert 30. Those skilled in the art will recognize that the number of flats 52 on the seal washer 50 and the corresponding flats 38 of the tubular extension 34 are shown to be two but may optionally vary between one and eight. As a result, the present invention does not rely on the elastomeric friction and bias forces between the seal washer 50 and the boot 40 to engage the stepped diameter portion 48 with the stepped portion 57 and to rotationally drive the seal washer 50 but does so in a secondary capacity until substantial wear occurs between the flats 38, 52 permitting movement between them. Preferably, there is a slight gap between the flats 52 and the flats 38.

Returning to FIG. 1, the pump front cover 10 and pump housing 80 are preferably made of thermoplastic material such as polypropylene, nylon, or polyvinyl chloride or the like so that the cover 10 can be hot plate or ultrasonically welded to the pump housing 80 as is conventional. The seal seat 60 is press-fit into the partial bore and against the shoulder 87 of the pump housing 80 and is prevented from rotation in the partial bore by the cooperating flats (not shown). When the pump unit 5 is assembled, the tubular extension 34 of insert 30 is passed through the inner diameter 54 and the flats 52 of the seal washer 50 and the inner diameter 61 of seal seat 60. Because the axial distance between the seal washer 50 and the seal seat 60 is less than the uncompressed axial height of the spring 70, the spring 70 is compressed axially causing the seal washer 50 to bear axially against the seal seat 60. The seal washer 50 axially deflects the coil spring 70 and the distal end 42 of the boot 40 until the end of the tubular extension 34 of insert 30 passes through housing bore 88 and extends out of the housing 80. The insert 30 is temporarily held in this axially extending position by grasping the tubular extension 34 protruding out of the housing 80. The pump cover 10 is then welded to the housing as described earlier. After welding, the cover 10 to the housing 80, the tubular extension 34 on the rigid insert 30 is released allowing face seal assembly 59 which includes the spring 70 and the boot 40, to decompress somewhat axially until the ceramic thrust disk 14 mounted in the partial cavity 23 in the face 22 of the insert 30 is prevented from further axial movement by the graphite phenolic thrust button 13 mounted in the cavity 12 of the cover 10. The thrust button 13 sets a gap 98 between the face 22 and the cover 10 to set the running clearance between the impeller face 22 and the cover 10.

In operation, the motor causes the shaft 7 to rotate the elastomeric bladed impeller 20 to pump fluid in and out of the pump 100. As the impeller 20 rotates, it causes the seal washer 50 to rotate by virtue of the positive drive of the flats 38 on the tubular extension 34 engaging the complimentary flats 52 on the inner diameter of the seat washer 50. The axial compression of the spring 70 biases the seal washer 50 into contact with the seal seat 60. The seal washer 50 is frictionally engaged by the distal end 42 of the boot 40 which grips around the first outer diameter 56 of the seal washer 50 and the second outer diameter 58 acts as a secondary rotation drive between the boot 40 and the washer 50. In this condition, the elastomeric lip 44 forms a static seal 49 around the first outer diameter 56 and second outer diameter 58 of the seal washer 50 to prevent any leakage past the seal washer 50 and out of the housing 80. The seal washer 50 is also forced to move axially towards the seal seat 60 by the axial compression on the boot 40. The boot 40 also forms an axial compressive force against the stepped portion 48 by the fluid pressure in the cavity 86. The compressed elastomeric material in the stepped portion 48 also forms a static seal 49 against the corresponding stop 57 which prevents any fluid being pumped by the impeller 20 from leaking past the seal washer 50, around the tubular extension 34 and out of the housing 80. A rigid annular case 75 with an optional radially extending lip may be disposed around the first outer diameter of the boot 48 to put a clamp load around the distal end 42 to engage the seal washer 50.

While the invention has been described in connection with a preferred embodiment, it will be understood that it is not intended to limit the invention to that embodiment only. On the contrary, it is intended to cover all alternative modifications and equivalents that may be included within the spirit and scope of the invention as defined by the appended claims.

What is claimed is:

1. A pump assembly adapted for being driven by a pump shaft, said pump assembly comprising:
    a pump housing;
    a pump cover secured to said pump housing, said pump cover and said housing having a portion forming an internal cavity;
    an impeller unit disposed in said cavity, said impeller unit having a plurality of elastomeric blades, a recess, and a tubular neck portion, said tubular neck portion adapted to be drivingly engaged to the shaft;
    a seal seat adjacent to said pump housing;
    a seal washer drivingly engaged to said tubular neck portion;
    a flexible elastomeric boot extending from said impeller unit and monolithically formed with the blades, said boot having a distal portion adjacent said seal washer; and
    a biasing member disposed in said recess, said biasing member urging said seal washer into engagement with said seal seat.

2. A pump assembly as claimed in claim 1 wherein said tubular neck portion has a front face spaced away from said cover and further comprising a thrust system between said front face and said cover.

3. A pump assembly as claimed in claim 1 wherein said tubular neck portion includes an outer diameter having at least one flat, and said seal washer having an inner diameter and at least one radially inwardly flat to cooperatively engage said at least one flat on said outer diameter of said tubular neck portion.

4. A pump assembly as claimed in claim 3 wherein said at least one flat on said seal washer slidingly engages said at least one flat on said tubular neck portion.

5. A pump assembly as claimed in claim 1 wherein said flexible boot is compressed between said blades and said seal washer, said flexible boot providing a secondary biasing force to urge said seal washer toward said seal seat.

6. An impeller and seal system adapted for being driven by a pump shaft extending through an aperture in a pump housing into an internal cavity, said system comprising;
    an impeller unit adapted to be disposed in the cavity, said impeller unit having a plurality of radially extending elastomeric blades, a portion forming a recess and a tubular neck portion, with said tubular neck portion adapted to be rotationally driven by the shaft, and an elastomeric flexible boot having a distal end extending therefrom and formed monolithically with the elastomeric blades;
    a seal washer positively engaged by said tubular neck portion and the distal end of the flexible boot for positive rotation therewith;
    a seal seat adjacent said washer, said seal seat having an elastomeric sleeve, said sleeve and said seal seat adapted to be disposed in a recess in the pump housing; and
    a biasing member disposed in said recess, said biasing member urging said seal washer into engagement with said seal seat.

7. A system as claimed in claim 6 further including a case member disposed around the distal end such that the distal end is biased against the seal washer.

8. A system as claimed in claim 6 wherein said tubular neck portion has a front face adapted to be spaced away from a cover of the pump housing; and said system further comprising a thrust system adapted to be located between said front face and said cover.

9. A system as claimed in claim 8 wherein said tubular neck portion includes an outer diameter having at least one flat and said seal washer has an inner diameter with at least one radially inwardly flat to cooperatively engage said at least one flat on said tubular neck portion.

10. A system as claimed in claim 9 wherein said at least one flat on said seal washer slidingly engages said at least one flat on said tubular neck portion.

11. A system as claimed in claim 8 wherein said flexible boot is compressed toward said blades, said flexible boot providing a secondary biasing force to urge said seal washer toward said seal seat.

12. A system as claimed in claim 11 wherein said seal washer has a stepped down outer diameter portion and shoulder wherein said distal portion has an inner diameter and a radially extending portion, said inner diameter adjacent to said outer diameter and said radially extending portion adjacent to said shoulder.

13. A system as claimed in claim 6 wherein said biasing member is a coil spring.

14. An integrated boot, seal and impeller system adapted for being driven by a pump shaft, said system comprising:
    an impeller unit having a plurality of radially extending elastomeric blades, a polymeric hub portion, a recess in said hub portion, and a polymeric tubular portion extending from said hub portion, said tubular portion adapted to be engaged with the shaft and including an outer diameter with a flat, said tubular portion having a seal washer slidingly engaged to said tubular portion, said seal washer having an inner diameter, with at least one flat thereon to engage said at least one flat on said outer diameter of said tubular portion;

an elastomeric flexible boot formed monolithically with and extending from said elastomeric blades, said boot having a distal portion adjacent said seal washer;

a case member disposed around said distal portion to clamp said distal portion to said seal washer;

a seal seat adjacent to said seal washer, said seal seat having an elastomeric sleeve; and a biasing member disposed in said recess and urging said seal washer into engagement with said seal seat.

15. A system as claimed in claim 14 wherein said at least one flat on said seal washer slidingly engages said at least one flat on said tubular portion.

16. A system as claimed in claim 14 wherein said flexible boot is compressed toward said blades, said flexible boot providing a secondary biasing force to urge said seal washer toward said seal seat.

17. A system as claimed in claim 16 wherein said seal washer has a stepped down outer diameter portion and shoulder wherein said distal portion has an inner diameter and a radially extending portion, said inner diameter adjacent to said outer diameter and said radially extending portion adjacent to said shoulder.

18. A system as claimed in claim 14 wherein said biasing member is a coil spring.

* * * * *